(12) United States Patent
Kopecek (10) Patent No.: US 12,345,216 B2
(45) Date of Patent: Jul. 1, 2025

(54) LIMITED FLOW THRUST REVERSER ACTUATING

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/666,193

(22) Filed: May 16, 2024

(65) Prior Publication Data

US 2024/0301842 A1   Sep. 12, 2024

Related U.S. Application Data (62) Division of application No. 17/319,916, filed on May 13, 2021, now Pat. No. 12,065,987.

(51) Int. Cl.
*F02K 1/76* (2006.01)
*F02K 1/60* (2006.01)

(52) U.S. Cl.
CPC ............... *F02K 1/763* (2013.01); *F02K 1/60* (2013.01); *F05D 2220/323* (2013.01); *F05D 2260/50* (2013.01); *F05D 2270/64* (2013.01)

(58) Field of Classification Search
CPC ............... F02K 1/76; F02K 1/763; F02K 1/60
See application file for complete search history.

(56) References Cited

U.S. PATENT DOCUMENTS

| | | | |
|---|---|---|---|
| 4,797,831 A | | 1/1989 | Dressing et al. |
| 5,415,076 A | * | 5/1995 | Krone ................ F15B 11/044 |
| | | | 91/440 |
| 8,170,771 B2 | | 5/2012 | Calmelat |
| 10,227,951 B2 | | 3/2019 | Kopecek |
| 2012/0151897 A1 | | 6/2012 | Kopecek et al. |
| 2015/0090810 A1 | | 4/2015 | Lallement et al. |
| 2016/0290283 A1 | * | 10/2016 | Vaughan ................ F02K 1/763 |

(Continued)

OTHER PUBLICATIONS

International Preliminary Report on Patentability in International Application No. PCT/US2022/072257, mailed on Nov. 23, 2023, 10 pages.

(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, an engine assembly includes a nacelle configured to at least partially surround an engine, and a thrust reverser coupled to the nacelle, the thrust reverser having a thrust-reversing element movable relative to the nacelle between a stowed position and a deployed position, a hydraulic actuator operably coupled to move the thrust-reversing element between the stowed position and the deployed position, and a fluid control system configured to operate the hydraulic actuator, the fluid control system having an electrohydraulic servo valve operable to selectively route fluid between a pressurized fluid source, the hydraulic actuator, and a fluid return reservoir, and a bypass fluid line providing fluid communication between the hydraulic actuator and the fluid return reservoir independent of the electrohydraulic servo valve.

7 Claims, 8 Drawing Sheets

(56) References Cited

U.S. PATENT DOCUMENTS

2018/0216572 A1\* 8/2018 Kopecek ................. F02K 1/763
2019/0101225 A1   4/2019 Amari et al.
2019/0211776 A1   7/2019 Kopecek
2020/0025142 A1   1/2020 Kopecek

OTHER PUBLICATIONS

International Search Report and Written Opinion in International Application No. PCT/US/2022/072257, mailed on Sep. 8, 2022, 18 pages.

\* cited by examiner

LIMITED FLOW THRUST REVERSER ACTUATING

CROSS-REFERENCE TO RELATED APPLICATIONS

This application is a divisional of U.S. patent Ser. No. 17/319,916, filed May 13, 2021, now allowed, which is hereby incorporated by reference in its entirety.

TECHNICAL FIELD

This specification generally relates to thrust reversers for engine assemblies, and more particularly to actuation systems for operating such thrust reversers with limited fluid flow demand.

BACKGROUND

Thrust reversers are commonly incorporated in aircraft turbine engines. The role of the thrust reverser is to improve the braking capability of the aircraft upon landing by redirecting fluid flow through the engine to provide a counter-thrust opposing the direction of travel. Conventional thrust reverser actuation systems place a large hydraulic flow demand on the aircraft hydraulic pump. To limit flow demand, regenerative-type directional control valves are often utilized. These directional control valves permit fluid flowing from the retract or "stow" chambers of the actuators to be recirculated to the actuator deploy chambers during deployment of the thrust reverser. The recirculation flow can be selectively implemented as an external aiding load is applied to the actuators during deployment. However, this technique is insufficient to keep the flow demand below the limit of the hydraulic pump capacity in certain new aircraft designs.

SUMMARY

In a general example, an engine assembly includes a nacelle configured to at least partially surround an engine, and a thrust reverser coupled to the nacelle, the thrust reverser having a thrust-reversing element movable relative to the nacelle between a stowed position and a deployed position, a hydraulic actuator operably coupled to move the thrust-reversing element between the stowed position and the deployed position, and a fluid control system configured to operate the hydraulic actuator, the fluid control system having an electrohydraulic servo valve operable to selectively route fluid between a pressurized fluid source, the hydraulic actuator, and a fluid return reservoir, and a bypass fluid line providing fluid communication between the hydraulic actuator and the fluid return reservoir independent of the electrohydraulic servo valve.

Various embodiments can include some, all, or none of the following features. The fluid control system can include an isolation control unit including an isolation control valve operable to selectively inhibit or permit fluid flow between the electrohydraulic servo valve, the pressurized fluid source and the fluid return reservoir, and wherein the isolation control unit further includes a piloted check valve operable in a first stage, where fluid flow from the fluid return reservoir to the hydraulic actuator through the bypass fluid line is inhibited, and a second stage, where fluid flow from the fluid return reservoir to the hydraulic actuator is permitted. The isolation control unit can include a solenoid valve coupled to both the isolation control valve and the piloted check valve, and configured to concurrently control operation of the isolation control valve and the piloted check valve. The solenoid valve can be configured to initiate transition of the piloted check valve from the first stage to the second stage in response to receiving a thrust-reverser-deploy command. The electrohydraulic servo valve can be operable in a deploy stage, where fluid from the pressurized fluid source can be routed to both a deploy chamber and a stow chamber of the hydraulic actuator, and a stow stage, where fluid from the pressurized fluid source can be routed only to the stow chamber of the hydraulic actuator; and wherein, when the electrohydraulic servo valve is in the deploy stage, the deploy chamber and the stow chamber are placed in fluid communication with one another to permit fluid recirculation. The fluid control system can include an anti-cavitation check valve residing on the bypass fluid line, the anti-cavitation check valve configured to permit fluid flow from the fluid return reservoir to the hydraulic actuator, while inhibiting fluid flow from the hydraulic actuator to the fluid return reservoir. The anti-cavitation check valve can be configured to permit fluid flow when fluid pressure in a deploy chamber of the hydraulic actuator is less than fluid pressure at the fluid return reservoir. The engine assembly can include a controller configured to control the electrohydraulic servo valve to selectively limit fluid flow out from the hydraulic actuator based on a position feedback signal.

In another general example, a fluid control system configured to operate a hydraulic actuator coupled to a thrust-reversing element coupled to a nacelle of an engine assembly includes an electrohydraulic servo valve operable to selectively route fluid between a pressurized fluid source, an actuator, and a fluid return reservoir, and a bypass fluid line providing fluid communication between the actuator and the fluid return reservoir independent of the electrohydraulic servo valve.

Various embodiments can include some, all, or none of the following features. The fluid control system can include an isolation control unit including an isolation control valve operable to selectively inhibit or permit fluid flow between the electrohydraulic servo valve, the pressurized fluid source and the fluid return reservoir, wherein the isolation control unit further includes a piloted check valve operable in a first stage, where fluid flow from the fluid return reservoir to the actuator through the bypass fluid line is inhibited, and a second stage, where fluid flow from the fluid return reservoir to the actuator is uninhibited. The isolation control unit can include a solenoid valve coupled to both the isolation control valve and the piloted check valve, and configured to concurrently control operation of the isolation control valve and the piloted check valve. The solenoid valve can be configured to initiate transition of the piloted check valve from the first stage to the second stage in response to receiving a thrust-reverser-deploy command. The electrohydraulic servo valve can be operable in a deploy stage, where fluid from the pressurized fluid source is routed to both a deploy chamber and a stow chamber of the actuator, and a stow stage, where fluid from the pressurized fluid source is routed only to the stow chamber of the actuator, and wherein, when the electrohydraulic servo valve is in the deploy stage, the deploy chamber and the stow chamber are placed in fluid communication with one another to permit fluid recirculation. The fluid control system can include an anti-cavitation check valve residing on the bypass fluid line, the anti-cavitation check valve configured to permit fluid flow from the fluid return reservoir to the actuator, while inhibiting fluid flow from the actuator to the fluid return reservoir. The anti-cavitation check valve can be configured to permit fluid flow when fluid pressure in a deploy chamber of the actuator is less than fluid pressure at the fluid return reservoir. The fluid control system can include a controller configured to control the electrohydraulic servo valve to selectively limit fluid flow out from the actuator based on a position feedback signal.

In another general example, a process of operating an engine thrust reverser comprising a thrust-reversing element movable between a stowed position and a deployed position includes transitioning the thrust-reversing element from the stowed position to the deployed position by conveying a primary fluid flow from a pressurized fluid source to a hydraulic actuator coupled to the thrust-reversing element, conveying a secondary fluid flow from a fluid return reservoir to the hydraulic actuator, the secondary fluid flow being separate from the primary fluid flow, and while conveying the primary fluid flow and the secondary fluid flow, operating an electrohydraulic servo valve operable to selectively route fluid between a pressurized fluid source, the hydraulic actuator, and a fluid return reservoir to limit the primary fluid flow to a predetermined flow threshold.

Various implementations can include some, all, or none of the following features. The predetermined flow threshold can be based on a predetermined maximum deployment speed for the transitioning. The method can include operating an isolation control valve to selectively inhibit or permit fluid flow between the electrohydraulic servo valve, the pressurized fluid source and the fluid return reservoir, configuring a piloted check valve to a first stage, where fluid flow from the fluid return reservoir to the hydraulic actuator through a bypass fluid line providing fluid communication between the hydraulic actuator and the fluid return reservoir independent of the electrohydraulic servo valve is inhibited, and configuring the piloted check valve to a second stage, where fluid flow from the fluid return reservoir to the hydraulic actuator is permitted. The method can include controlling a solenoid valve coupled to both the isolation control valve and the piloted check valve, and concurrently controlling, by the solenoid valve, operation of the isolation control valve and the piloted check valve. The method can include receiving a thrust-reverser-deploy command, controlling the solenoid valve based on the receiving, and initiating, by the solenoid valve, transition of the piloted check valve from the first stage to the second stage. The method can also include operating the electrohydraulic servo valve in a deploy stage, routing, by the electrohydraulic servo valve in the deploy stage, fluid from the pressurized fluid source to a deploy chamber of the hydraulic actuator, fluidically connecting, by the electrohydraulic servo valve in the deploy stage, the deploy chamber and a stow chamber, recirculating, through the electrohydraulic servo valve in the deploy stage, fluid from the stow chamber to the deploy chamber, operating the electrohydraulic servo valve in a stow stage, and routing, by the electrohydraulic servo valve in the stow stage, fluid from the pressurized fluid source only to the stow chamber of the hydraulic actuator. The method can include permitting, by an anti-cavitation check valve residing on bypass fluid line providing fluid communication between the hydraulic actuator and the fluid return reservoir independent of the electrohydraulic servo valve, fluid flow from the fluid return reservoir to the hydraulic actuator, and inhibiting, by the anti-cavitation check valve, fluid flow from the hydraulic actuator to the fluid return reservoir. The anti-cavitation check valve can be configured to permit fluid flow when a pressure in a deploy chamber of the hydraulic actuator is less than a pressure at the fluid return reservoir. The method can include receiving a position feedback signal representative of a position of the thrust-reversing element, wherein the predetermined flow threshold is based on a predetermined maximum deployment speed for the transitioning.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Various elements of the drawings may be exaggerated or illustrated schematically to better show the features, process steps, and results. Like reference numbers and designations in the various drawings may indicate like elements.

DETAILED DESCRIPTION

Various embodiments of the present disclosure are directed to thrust reverser actuation systems ("TRAS") that effectively limit flow demand placed on an onboard pressurized fluid source. In some examples, these TRAS limit flow demand and meet reverser-deploy timing requirements by restricting or regulating the flow from system pressure into the directional control valve ("DCV") while making up the shortfall in flow demand by routing return pressure into the hydraulic actuator deploy chambers. This flow-limiting technique can be implemented in conjunction with, or independent of, flow regeneration techniques.

A TRAS requires a relatively high fluid flow from the vehicle hydraulic system during the deploy cycle of the reverser, and a relatively low flow during the retract cycle. Meeting the flow demand to achieve the required reverser deploy time while not drawing greater system pressure flow than the onboard pump can provide is often problematic. If the maximum flow demand requirement cannot be met even with a regenerative type DCV, the bore of the actuator can be reduced and/or the allowed deploy time can be increased. These design options, however, have the negative consequences of either reducing the force authority of the TRAS or adversely affecting the time performance of the TRAS. One other option is to increase the size of the onboard pump. However, this may also be troublesome due to increased weight, cost, and form factor/envelope.

In some examples, the fluid flow rate requirement of a regenerative-type TRAS is equivalent to the velocity multiplied by the area of the rods of the actuators. However, the energy (pressure multiplied by volume) from this flow is only needed during the first portion of the deploy stroke when the load on the actuators is compressive. Certain embodiments of the present disclosure take advantage of the fact that the energy from the fluid is no longer needed once the load on the TRAS has changed from compression to tension in the presence of an "aiding load" (e.g., the force of surrounding airflow acting on the thrust reverser door elements). To limit the flow demand of the TRAS, the flow from system pressure (which may be recirculated through the DCV) is supplemented with flow from the hydraulic fluid return reservoir when an aiding load is present.

Figure 1A:
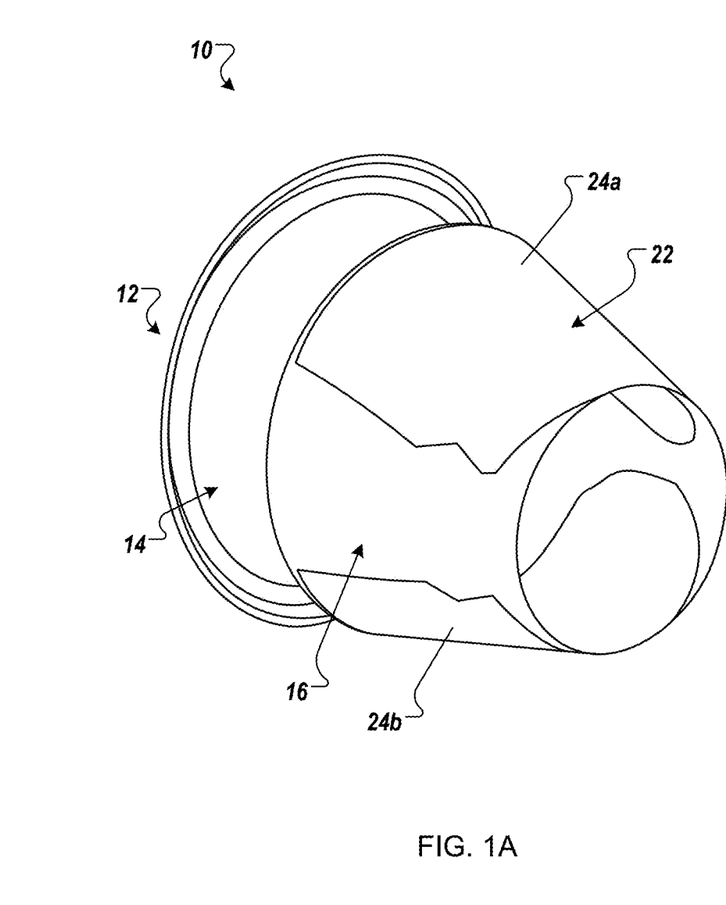
FIG. 1A is a rear perspective view illustrating a portion of an engine assembly with the elements of a thrust reverser in a stowed position.
Figure 1B:
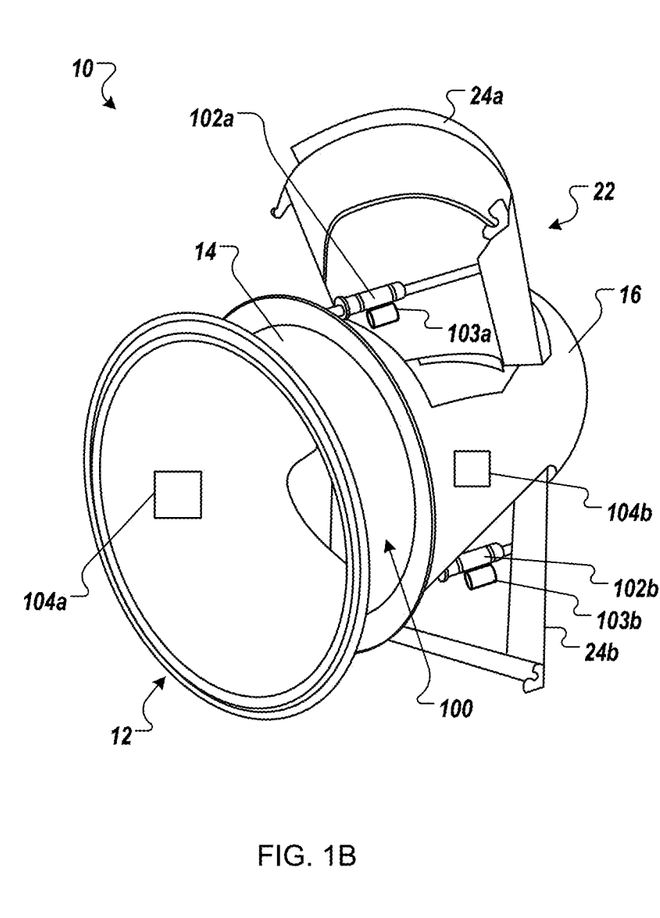
FIG. 1B is a front perspective view illustrating the engine assembly of FIG. 1A with the elements of the thrust reverser in a deployed position.

FIGS. 1A and 1B illustrate an example engine assembly 10 in accordance with one or more embodiments of the present disclosure. In some embodiments, the engine assembly 10 may be incorporated in a powered vehicle (not shown), such as an aircraft. In this example, the engine assembly 10 includes a nacelle 12 supporting an engine thrust reverser 22. As shown, the nacelle 12 is an annular structure coupleable to the vehicle's frame for housing a turbine engine (e.g., a turbojet or turbofan engine) powering the vehicle. In this example, the nacelle 12 includes a front housing 14 and a rear housing 16. The front housing 14 and the rear housing 16 are tubular, frusto-conical components, with the rear housing 16 being mounted co-axially with the front housing 14. The front housing 14 is designed to receive the turbine engine, and the rear housing 16 is designed to support the thrust reverser 22. In this example, the thrust reverser 22 is a pivoting-door type arrangement, a clamshell configuration in particular. However, other suitable types of thrust reversers (e.g., cascade, target door or petal door type thrust reversers) may also be compatible with the actuation systems described herein.

The thrust reverser 22 includes a pair of thrust-reversing elements 24a and 24b and a thrust reverser actuation system (TRAS) 100 (shown schematically in FIG. 1B). The thrust-reversing elements 24a and 24b are shown in this example as bulkheads or "doors" pivotally mounted to the rear housing 16 of the nacelle 12. The elements 24a and 24b are shown in a stowed position, pivoted inward towards the nacelle 12, in FIG. 1A and in a deployed position, pivoted outward away from the nacelle 12, in FIG. 1B. The TRAS 100 is appropriately configured to control operation of the elements 24a and 24b, regulating movement between the stowed and deployed positions, for example, based on one or more control signals. In this example, the TRAS 100 includes hydraulic actuators 102a and 102b, electrohydraulic servo valves (EHSV) 103a and 103b, and hydraulic locks 104a and 104b. Each of the hydraulic actuators 102a and 102b is operably coupled to move a respective one of the elements 24a and 24b between the stowed and deployed positions. The hydraulic actuators 102a and 102b are designed to provide linear movement, pushing the elements 24a and 24b outward from the stowed position to the deployed position and pulling the elements 24a and 24b inward from the deployed position to the stowed position. In this example, each of the hydraulic locks 104a and 104b are engageable with both of the elements 24a and 24b, such that either of the locks can independently prevent the unintentional deployment of both elements if the other lock becomes inoperable. The hydraulic locks 104a and 104b are configured to transition between an engaged state, where movement (e.g., deployment) of the elements 24a and 24b is inhibited, and a released state, where movement of the elements 24a and 24b is uninhibited. The EHSVs 103a and 103b are fluidically coupled to (or placed in fluid communication with) each of the hydraulic actuators 102a and 102b, and each of the hydraulic locks 104a and 104b. The EHSVs 103a and 103b receive pressurized fluid from a fluid source and selectively ports the fluid to the hydraulic actuators 102a and 102b and hydraulic locks 104a and 104b to operate these components via hydraulic pressure.

Note that the term "fluidically coupled" is used in the present disclosure when referring to components that are capable of being placed in a condition, state, or stage where fluid communication between them is permitted. Further note that the terms "fluid communication" and "fluidically coupled" are used synonymously throughout the present disclosure.

FIGS. 2A-2F illustrate a first example thrust reverser actuation system 200, such as may be used in conjunction with the example engine assembly 10 shown and described above with respect to FIGS. 1A and 1B. Thus, similar to the TRAS 100, the TRAS 200 includes first, second, third, and fourth actuators 202a-202d, first, second, third, and fourth electrohydraulic servo valves (EHSVs) 203a-203d, and a controller 206 (the hydraulic locks are not shown in this example). The TRAS 200 further includes an isolation control unit 208 ("ICU"), a fluid source 210 and a fluid reservoir 212. The fluid source 210 may include one or more suitable pressure regulating apparatuses (e.g. a pump) for controlling (e.g., increasing) the pressure of a working fluid (e.g., a hydraulic fluid). The fluid reservoir 212 may include one or more vessels for receiving working fluid passed through various components of the actuating system, containing the working fluid, and supplying the working fluid to the fluid source 210.

The controller 206 is configured to control the operation of the EHSVs 203a-203d. The EHSVs 203a-203d are operable to selectively route fluid between the fluid source 210, the actuators 202a-202d, and the fluid reservoir 212 in order to transition the actuators 202a-202d (and the mechanically coupled thrust reverser door elements) between stowed and deployed positions. The ICU 208 is located upstream of the EHSVs 203a-203d, and includes various functional elements (described below) operable to selectively inhibit or permit fluid flow between the EHSVs 203a-203d, the fluid source 210, and the fluid reservoir 212.

In this example, the ICU 208 includes an isolation control valve 214 ("ICV"), a piloted check valve 216, and a solenoid valve 218 configured to concurrently control operation of both the isolation control valve 214 and the piloted check valve 216. The ICV 214 and solenoid valve 218 are each fluidically coupled to the fluid source 210 and fluid reservoir 212 by various fluid lines. The piloted check valve 216 is fluidically coupled to the fluid reservoir 212. As shown, with respect to the fluid reservoir 212, the piloted check valve 216 is located upstream of all other functional components of the TRAS 200.

In this example, the ICV 214 is a spring-biased, three-port pressure regulating component, including a high pressure port 222 fluidically coupled to the fluid source 210, a low pressure port 220 fluidically coupled to the fluid reservoir 212, and a service port 224 fluidically coupled the EHSVs 203a-203d. The ICV 214 is configured to transition between a first stage, where fluid flow between the low pressure port 220 and the service port 224 is permitted (see FIG. 2A), and a second stage, where fluid flow between the high pressure port 222 and the service port 224 is permitted (see FIGS. 2B, 2C, 2D, and 2F). Thus, when the ICV 214 is in the first stage, the EHSVs 203a-203d are placed in fluid communication with the fluid reservoir 212, and when the ICV is in the second stage, the EHSV's 203a-203d are placed in fluid communication with the fluid source 210. The default stage of the ICV 214 is the first stage, which inhibits fluid flow into the EHSVs 203a-203d for fire protection purposes. The ICV 214 further includes a pilot valve 226 that controls the transition from the first stage to the second stage, and vice versa.

The piloted check valve 216 is also a three-port valve, including a return-side port 228 fluidically coupled to the fluid reservoir 212, a system-side port 230 fluidically coupled to other downstream components of the TRAS 200, and a pilot port 232. Similar to the ICV 214, the piloted check valve 216 is configured to transition between a first stage and a second stage, with the first stage being the default. In the first, default stage, the piloted check valve 216 only permits fluid flow in one direction-from the system-side port 230 to the return-side port 228. This stage only allows fluid to flow from the TRAS components to the fluid reservoir 212. In the second stage, the piloted check valve 216 allows free fluid flow between return-side port 228 and system-side port 230. Thus, reverse flow from the fluid reservoir 212 to the TRAS components is permitted, unlike in the first stage of the piloted check valve 216. Fluid pressure received at the pilot port 232 controls the transition from the first stage to the second stage, and vice versa. Like the ICV 214, the default stage of the piloted check valve 216 is the first stage, which inhibits fluid flow from the fluid reservoir 212 into the EHSVs 203a-203d for fire protection purposes.

The solenoid valve 218 is fluidically coupled to both the ICV 214 and the piloted check valve 216, and configured to hydraulically control these components to transition between different states/stages in response to a control signal—e.g., an activation/deactivation signal. Similar to the ICV 214, the solenoid valve 218 is a spring-biased, three-port device. Accordingly, the solenoid valve 218 includes a high pressure port 234 fluidically coupled to the fluid source 210, a low pressure port 236 fluidically coupled to the fluid reservoir 212, and an actuator port 238. The actuator port 238 is fluidically coupled with both the pilot valve 226 of the ICV 214 and the pilot port 232 of the piloted check valve 216.

The solenoid valve 218 transitions between ON and OFF conditions based on a received activation/deactivation control signal. In the OFF condition (see FIG. 2A), fluid flow between the low pressure port 236 and the actuator port 238 is permitted, which places the pilot valve 226 of the ICV 214 and the pilot port 232 of the piloted check valve 216 in fluid communication with the fluid reservoir 212. The relatively low pressure of the fluid reservoir 212 is insufficient to prompt a stage transition of either the ICV 214 or piloted check valve 216. In the ON condition (see FIGS. 2B, 20, 2D, and 2F), fluid flow between the high pressure port 234 and the actuator port 238 is permitted, which places the pilot valve 226 of the ICV 214 and the pilot port 232 of the piloted check valve 216 in fluid communication with the fluid source 210. Unlike the relatively low pressure of fluid reservoir 212, the relatively high pressure of fluid source 210 causes the ICV 214 and piloted check valve 216 to transition from their first to second stages. Like the ICV 214 and piloted check valve 216, the solenoid valve 218 defaults to the OFF condition to prevent unintentional fluid flow to the EHSVs 203a-203d.

The ICU 208 still further includes a low pressure line 240 downstream of the piloted check valve 216 that runs outside the ICV 214, and therefore remains in fluid communication with the fluid reservoir 212, subject to the directional flow control performed by the piloted check valve 216. The low pressure line 240 runs to the EHSVs 203a-203d, acting as a bypass fluid line providing fluid communication between the actuators 202a-202d and the fluid reservoir 212 independent of the EHSVs 203a-203d.

The EHSVs 203a-203d act both as directional control valves (DCV) and as flow limiting devices. In the illustrated examples, the EHSVs 203a-203d are spring-biased, four port pressure-regulating components. One side of the EHSVs 203a-203d includes a control port 248 in fluid communication with the fluid line 251 and the service port 224 of the ICV 214, and a low pressure port 250 in fluid communication with the low pressure line 240 and the fluid reservoir 212 via the system-side port 230 of the piloted check valve 216.

The opposite sides of the EHSVs 203a-203d include a deploy port 252 and a stow port 254 fluidically coupled to the actuators 202a-202d. Similar to the ICV 214, the EHSVs 203a-203d are configured to transition between a first stage and a second stage. The stage of the EHSVs 203a-203d dictates flow between the ports on its two opposite sides. In the first, default stage of the EHSVs 203a-203d (see FIGS. 2A, 2B, and 2F), the control port 248 is fluidically coupled to the stow port 254, and the low pressure port 250 is fluidically coupled to the deploy port 252. In the second stage of the EHSVs 203a-203d (see FIG. 2C-2D), the control port 248 is fluidically coupled to the deploy port 252, and the low pressure port 250 is fluidically coupled to the stow port 254. The stow and deploy ports 254, 252 are also placed in fluid communication with one another in the second stage.

The actuators 202a-202d are designed to move the respective elements (e.g., elements 24a and 24b shown in FIGS. 1A and 1B) of a thrust reverser (e.g., thrust reverser 22 of FIGS. 1A and 1B) between a stowed position and a deployed position. In this example, the actuators 202a-202d are substantially identical both structurally and functionally, and will therefore be described in unison. Each of the actuators 202a-202d includes a housing 266 having an interior cavity 268. The actuator housing 266 is mechanically coupled to the nacelle (e.g., nacelle 12) of the thrust reverser. The housing's interior cavity 268 receives an elongated actuator rod 270 including a piston member 272 at a proximal end and a coupler 274 at an opposite distal end. The coupler 274 attaches the actuator rod 270 to the element (e.g., door) of the thrust reverser, such that the element moves (e.g., pivots) in response to movement by the actuator rod 270. The piston member 272 of the actuator rod 270 seals against the wall of the interior housing cavity 268, bifurcating the cavity into a deploy chamber 276 and a stow chamber 278. The actuator housing 266 further includes a first fluid port 280 leading to the deploy chamber 276 and a stow port 282 leading to the stow chamber 278. The first fluid port 280 is fluidically coupled to the EHSV's deploy port 252, and the stow port 282 is fluidically coupled to the EHSV's stow port 254.

The actuator rod 270 is movable within the interior cavity 268 of the housing 266. For example, the actuator rod 270 is movable in response to unbalanced fluid pressure force between the deploy chambers 276 and the stow chambers 278 acting on the piston member 272. When the hydraulic pressure force in the deploy chamber 276 is greater than the hydraulic pressure force in the stow chamber 278, the actuator rod 270 moves "downward" to deploy the attached thrust reverser element. Conversely, when hydraulic pressure force in the stow chamber 278 is greater, the actuator rod 270 moves "upward" to stow the thrust reverser element. In this example, the actuators 202a-202d are "unbalanced," because the piston area exposed to fluid pressure in the deploy chamber 276 is greater than the piston area in the stow chamber 278 (due to the presence of the rod extending through the stow chamber). The greater piston area creates a greater hydraulic force output. As such, when the deploy chamber 276 and the stow chamber 278 are at equal pressure, the actuator rod 270 will be urged downward to deploy the thrust reverser element due to the greater force output of the deploy chamber 276.

A position sensor 290 (e.g., a variable displacement transformer, VDT) is configured to sense the amount of extension of the actuator rod 270. The position sensor 290 is in communication with a controller 206 over a feedback bus 260 to provide position feedback sensor signals representative of the actuator rod 270 position to the controller 206.

Figure 2A:
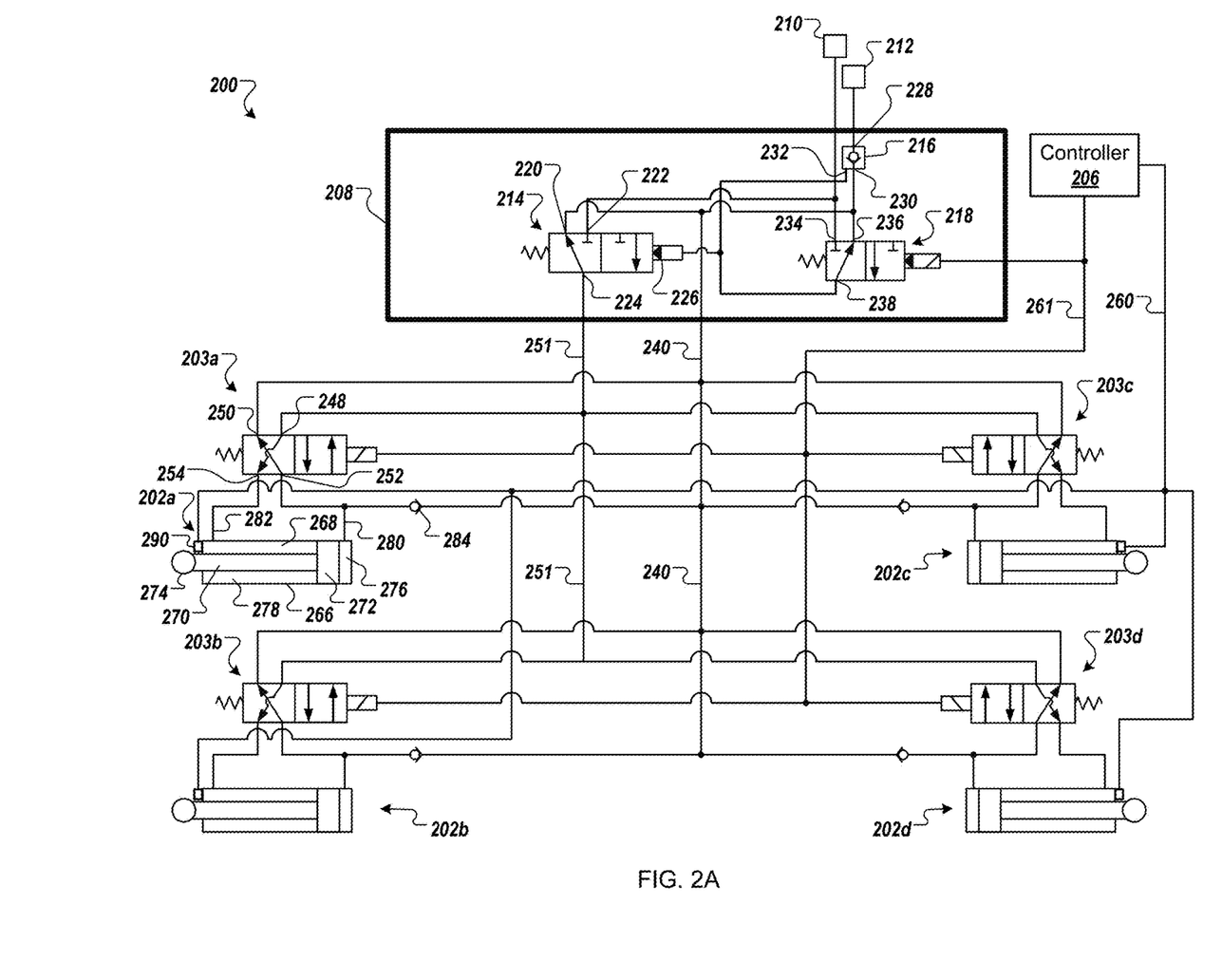
FIGS. 2A-2F are progressive diagrams illustrating operation of a first example thrust-reverser actuation system during deployment and stowing of the thrust reverser elements.
Figure 2B:
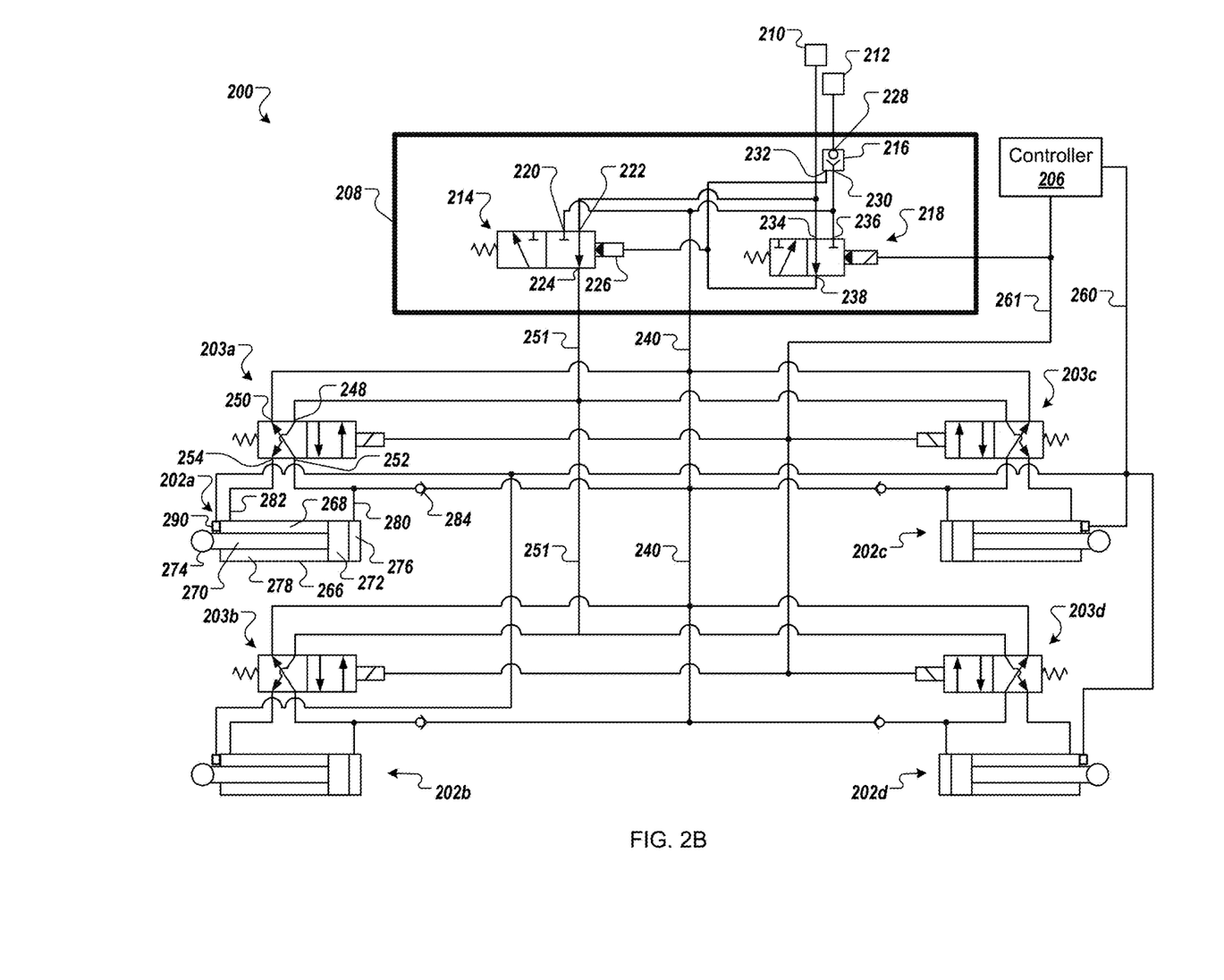
Figure 2C:
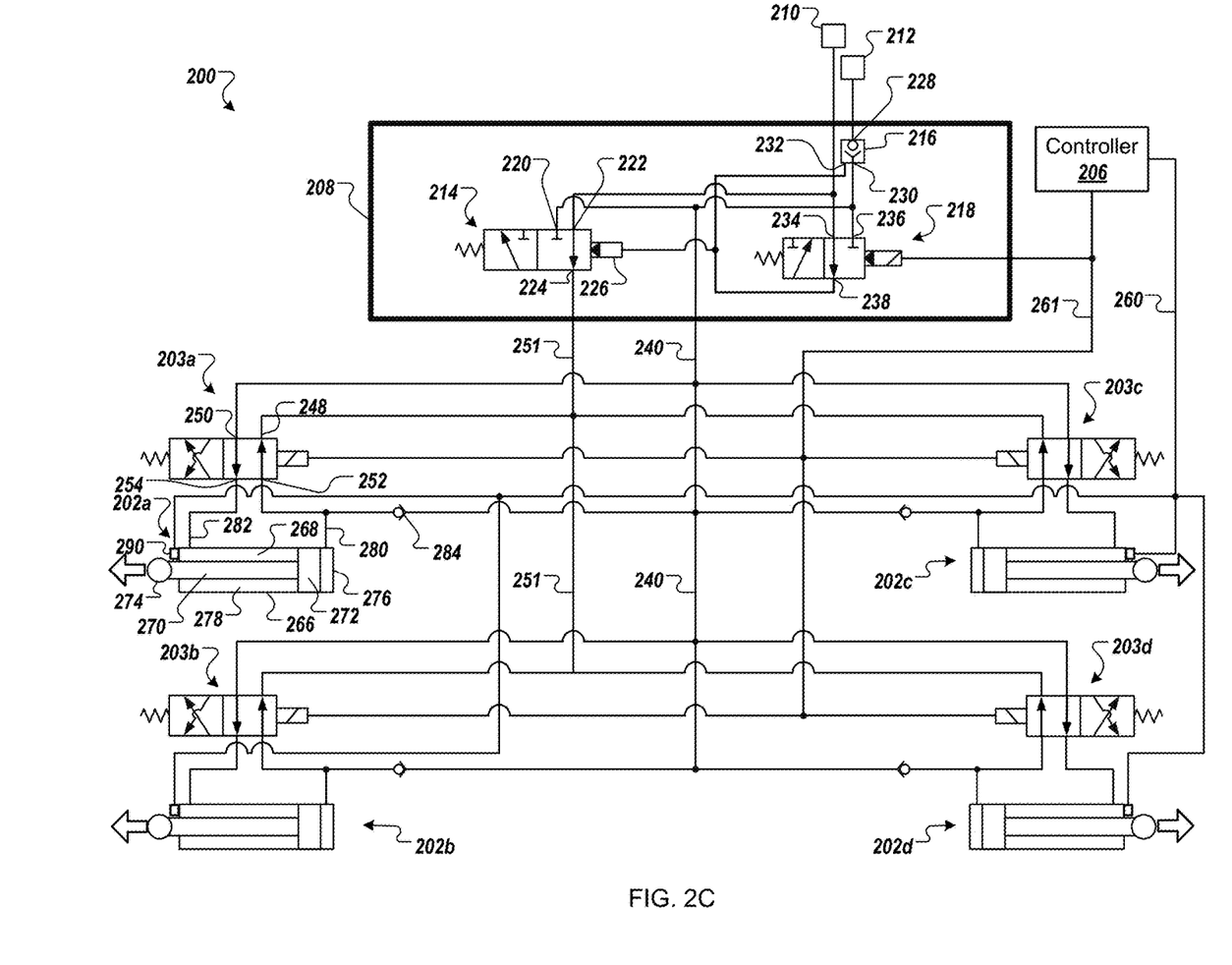
Figure 2D:
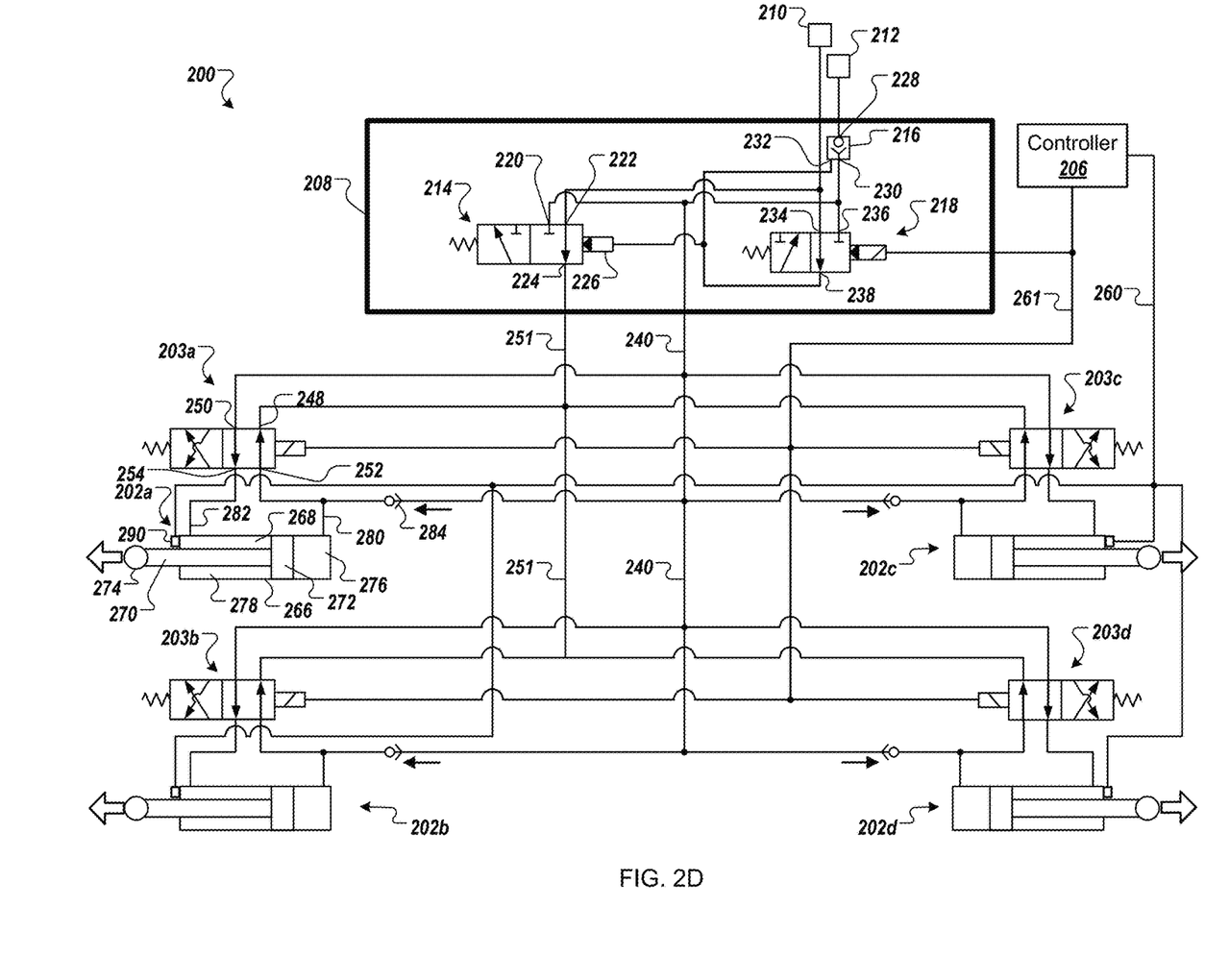

The EHSVs 203a-203d are configured to inhibit the pressure/fluid draw by the actuators 202a-202d on the fluid source 210 from surpassing a predetermined flow threshold during the deploy process (see FIG. 2C, 2D). In this example, the EHSVs 203a-203d are controlled by the controller 206 over a control bus 261 in a closed-loop control configuration, based on the predetermined flow threshold and on position feedback signals received from the position sensors 290. In some implementations, the predetermined flow threshold can be based on a predetermined maximum deployment speed for the transitioning. The EHSVs 203a-203d are controlled by the controller 206 to control and limit the speed at which the actuator rods 270 are allowed to move. In some embodiments, fluid flow sensors can be arranged to sense flow through the first fluid ports 280 or the stow ports 282, and the controller 206 can be configured to control the EHSVs 203a-203d based on fluid flows sensed by the fluid flow sensors.

As noted above, limiting the flow demand can be advantageous because it allows the fluid source 210 and supporting system components (e.g., fluid lines, valves, etc.) to be appropriately provided in a configuration with practical weight, form factor/envelope, and cost. Regenerative and supplemental flow techniques described below are incorporated into the TRAS to accommodate this limited flow demand without sacrificing deployment performance.

The above-described configurations of the EHSVs 203a-203d and the actuators 202a-202d enables the recirculation of fluid during the deploy process. As previously discussed, the second stage of the EHSVs 203a-203d places the control port 248 in fluidic communication with the deploy port 252, and the low pressure port 250 is placed in fluidic communication with the stow port 254. Thus, in this second stage, the deploy chamber 276 of the actuators 202a-202d is exposed to the relatively high pressure of the fluid source 210, and isolated from the relatively low pressure of the fluid reservoir 212. The unbalanced configuration of the actuators 202a-202d causes the actuator rods 270 to deploy the thrust reverser elements in this state of the system.

As the elements begin to deploy, the force of surrounding airflow begins to pull the elements open, providing an "aiding load" that further urges the actuator rods 270 in the deploy direction. As the aiding load pulls the actuator rods 270, fluid is forced from the stow chambers 278 and simultaneously drawn into the deploy chambers 276, placing the former in high pressure and the latter in low pressure. In some implementations, the force of the "aiding load" on the actuator rods 270 can increase the fluid demand needed to backfill the deploy chamber 276.

Fluid flow demand during the deploy process is lessened by fluid recirculation from the stow chamber 278 to the deploy chamber 276. The deploy port 280 is connected to the low pressure fluid line 240 through an anti-cavitation check valve 284 that permits fluid flow in a single direction, from the stow chamber 278, to the low pressure fluid line 240, through the check valve 284, to the deploy chamber 276.

Fluid flow demand during the deploy process is further lessened by supplemental fluid flow provided by the portion of the low pressure line 240 fluidically linked to the fluid reservoir 212 through the piloted check valve 216. As shown, when unpiloted, the piloted check valve 216 permits fluid flow in a single direction, from the low pressure fluid line 240 to the fluid reservoir 212. However, when the solenoid valve 218 is in the second stage, fluid pressure from the fluid source 210 is applied to the pilot port 232, forcing the piloted check valve 216 open to allow fluid to flow from the fluid reservoir 212 to the low pressure fluid line 240. This supplemental fluid flow takes place during the deploy process when fluid recirculation combined with the limited primary fluid flow from the fluid source 210 is insufficient to meet the fluid draw of the deploy chambers 276 (e.g., the supplemental flow makes up for the imbalance between the stow chamber 278 and the deploy chamber 276. In this state, the pressure of the deploy chambers 276 falls below the pressure of the fluid reservoir 212, which instigates the supplemental fluid flow.

Absent recirculation and supplemental flow drawn from the fluid reservoir 212, the low-pressure deploy chambers 276 would draw additional fluid from the fluid source 210. For example, the recirculation and supplemental flow can take advantage of the "aiding load" to deploy the thrust reverser elements without increasing the size and capacity of the fluid source or the fluid components connecting the fluid source to the deploy chamber 276 (e.g., and avoid the additional weight and cost of such increases).

FIG. 2A illustrates the TRAS 200 in an example stow condition, such as may be maintained during use while an aircraft is grounded or in flight. In the stow condition, the TRAS 200 is configured to inhibit fluid flow from the fluid source 210 to the EHSVs 203a-203d and the actuators 202a-202d. Accordingly, solenoid valve 218 is placed in the OFF condition, which causes ICV 214 to remain in the default first stage. As described above, the first stage of the ICV 214 fluidically couples its service port 224 to the low pressure port 220, placing the deploy port 280 in fluid communication with the low pressure of the fluid reservoir 212. Thus, fluid is allowed to flow from the deploy chamber 276 to the fluid reservoir 212 to potentially evacuate fluid from the system, while fluid flow from the fluid source to the EHSVs 203a-203d is prevented.

FIG. 2B illustrates the TRAS 200 in an example over-stow command condition. Here, the solenoid valve 218 is placed in the ON condition, which causes both the ICV 214 and piloted check valve 216 to transition from their respective first-to-second stages. In the second stage of the piloted check valve 216, supplemental fluid flow from the fluid reservoir 212 to the downstream system components is permitted via low pressure line 240. In the second stage of the ICV 214, the service port 224 is fluidically coupled to the high pressure port 222, placing the EHSVs 203a-203d in fluid communication with the pressurized fluid source 210.

The controller 206 commands the EHSVs 203a-203d to their stow stage configuration, fluidically connecting the stow chamber 278 to the pressurized fluid source 210 and fluidically connecting the deploy chamber 276 to the fluid reservoir 212. In the illustrated example configuration, the actuators 202a-202d are urged into their stowed configuration. In some implementations, the TRAS 200 can be put into an over-stow configuration in order to aid in unlocking the actuators 202a-202d in preparation for a commanded deployment (e.g., to release an over-center locking mechanism to permit release, to relieve tension on a retaining pin to allow it to be retracted).

FIG. 2C illustrates the TRAS 200 in an example compressive load stage of a deploy command condition. In some implementations, the illustrated example configuration can exist during initial deployment of the thrust reverser elements, when fluid pressure is needed in order to urge movement of the actuator rod 270 before wind resistance catches the thrust reverser elements to provide an "aiding load". For example, the illustrated configuration may be used or exist during about the first 10%-20% of the deployment process.

Here, the solenoid valve 218 remains in the ON condition, which causes both the ICV 214 and piloted check valve 216 to remain in their respective second stages. In the second stage of the piloted check valve 216, supplemental fluid flow from the fluid reservoir 212 to the downstream system components is permitted via low pressure line 240. In the second stage of the ICV 214, the service port 224 is fluidically coupled to the high pressure port 222, placing the EHSVs 203a-203d in fluid communication with the pressurized fluid source 210. The controller 206 commands the EHSVs 203a-203d to their deploy stage configuration, fluidically connecting the deploy chamber 276 to the pressurized fluid source 210 and fluidically connecting the stow chamber 278 to the fluid reservoir 212. Fluid pressure from the pressurized fluid source 210 pressurizes the deploy chamber 276, urging movement of the actuator rod 270 toward deployment.

FIG. 2D illustrates the TRAS 200 in an example tension load stage of a deploy command condition. In some implementations, the illustrated example configuration can exist during latter deployment of the thrust reverser elements, when wind resistance catches the thrust reverser elements and provides an "aiding load" that urges movement of the actuator rod 270 at a rate that exceeds the ability of the pressurized fluid source 210 to supply fluid to the deploy chamber 276. For example, the illustrated configuration may be used or exist during about the final 80%-90% of the deployment process.

Here, the solenoid valve 218 remains in the ON condition, which causes both the ICV 214 and piloted check valve 216 to remain in their respective second stages. In the second stage of the piloted check valve 216, supplemental fluid flow from the fluid reservoir 212 to the downstream system components is permitted via low pressure line 240. In the second stage of the ICV 214, the service port 224 is fluidically coupled to the high pressure port 222, placing the EHSVs 203a-203d in fluid communication with the pressurized fluid source 210. The controller 206 commands the EHSVs 203a-203d to remain in the deploy configuration, fluidically connecting the deploy chamber 276 to the pressurized fluid source 210 and fluidically connecting the stow chamber 278 to the fluid reservoir 212.

Mechanical tension on the actuator rod 270 urges movement of the actuator rod 270 toward deployment, which urges fluid out of the stow chamber 278. The fluid flows from the stow port 282 to the low pressure fluid line 240, opening the check valve 284. Fluid from the low pressure fluid line 240 flows through the check valve 284 to the deploy chamber 276.

Since the actuator 202a is imbalanced, relatively less fluid flows out of the stow port 282 than is needed to backfill the deploy chamber 276. This imbalance of fluid flow is supplemented by supplemental fluid flow from the fluid reservoir 212 to the downstream system components though the low pressure line 240.

During the second stage of deployment, energy from the tension on the actuator rod 270 becomes the primary driver of movement of the actuator rod 270. As previously discussed, the internal hydraulic force provided by components of the TRAS 200 is complemented by an external aiding load that effectively pulls the thrust reverser elements open towards the deploy position. Fluid recirculation through the check valve 284, supplemented by fluid from the fluid reservoir 212, helps to satiate the fluid flow demand by the deploy chambers 276 of the actuators 202a-202d. When the pressure in the deploy chambers 276 drops below the return pressure of the fluid reservoir 212, return fluid is drawn into the chambers via the low pressure line 240 to prevent cavitation.

During the second stage of deployment, the controller 206 can control the EHSVs 203a-203d to act as controllably adjustable fluid restrictors or resistors to selectively (e.g., partly or entirely) block or limit fluid flow out of the stow port of the actuator to the low pressure fluid line 240. In some implementations, by controlling the EHSVs 203a-203d, the speed of deployment of the thrust reverser elements due to the external aiding load can be limited, stopped, or otherwise controlled.

Figure 2E:
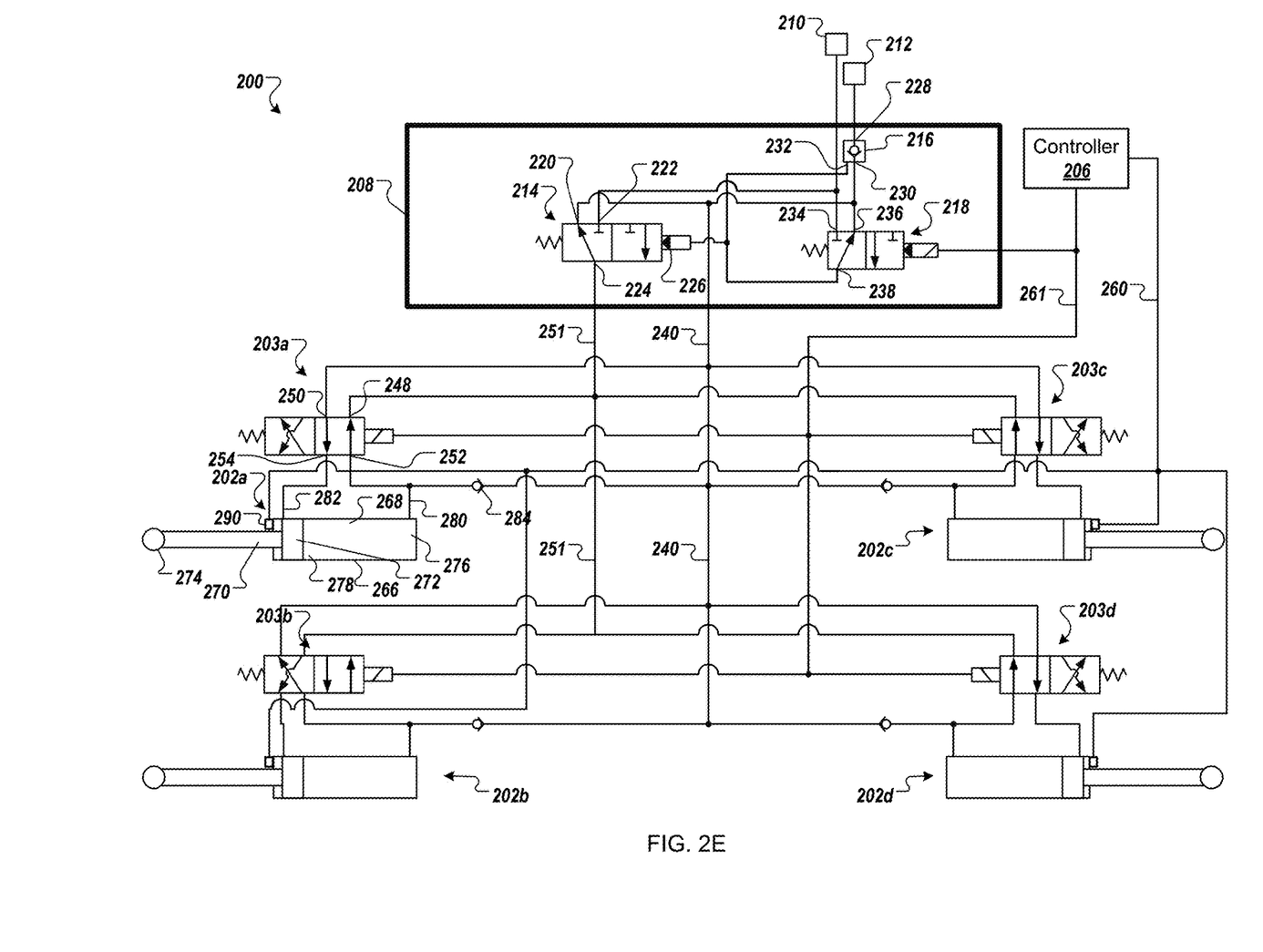

FIG. 2E illustrates the TRAS 200 in an example fully deployed condition, such as may be maintained during TRAS usage. In the fully deployed condition, the ICU 208 is de-energized, causing the ICV 214 and the solenoid valve 218 to return in their default first stages, and depressurizing the pilot port 232 allowing the piloted check valve 216 to close. The first stage of the ICV 214 fluidically couples its service port 224 to the low pressure port 220, placing the deploy port 280 in fluid communication with the low pressure of the fluid reservoir 212. Thus, fluid is allowed to flow from the deploy chamber 276 to the fluid reservoir 212 to potentially evacuate fluid from the system, while fluid flow from the fluid source to the EHSVs 203a-203d is prevented.

In the illustrated example configuration, at least two levels of safety against inadvertent stowing are provided. For example, TRAS 200 is protected against failure of ICV 214 to open, and the TRAS 200 can be protected against the EHSVs 203a-203d being falsely commanded to stow.

Figure 2F:
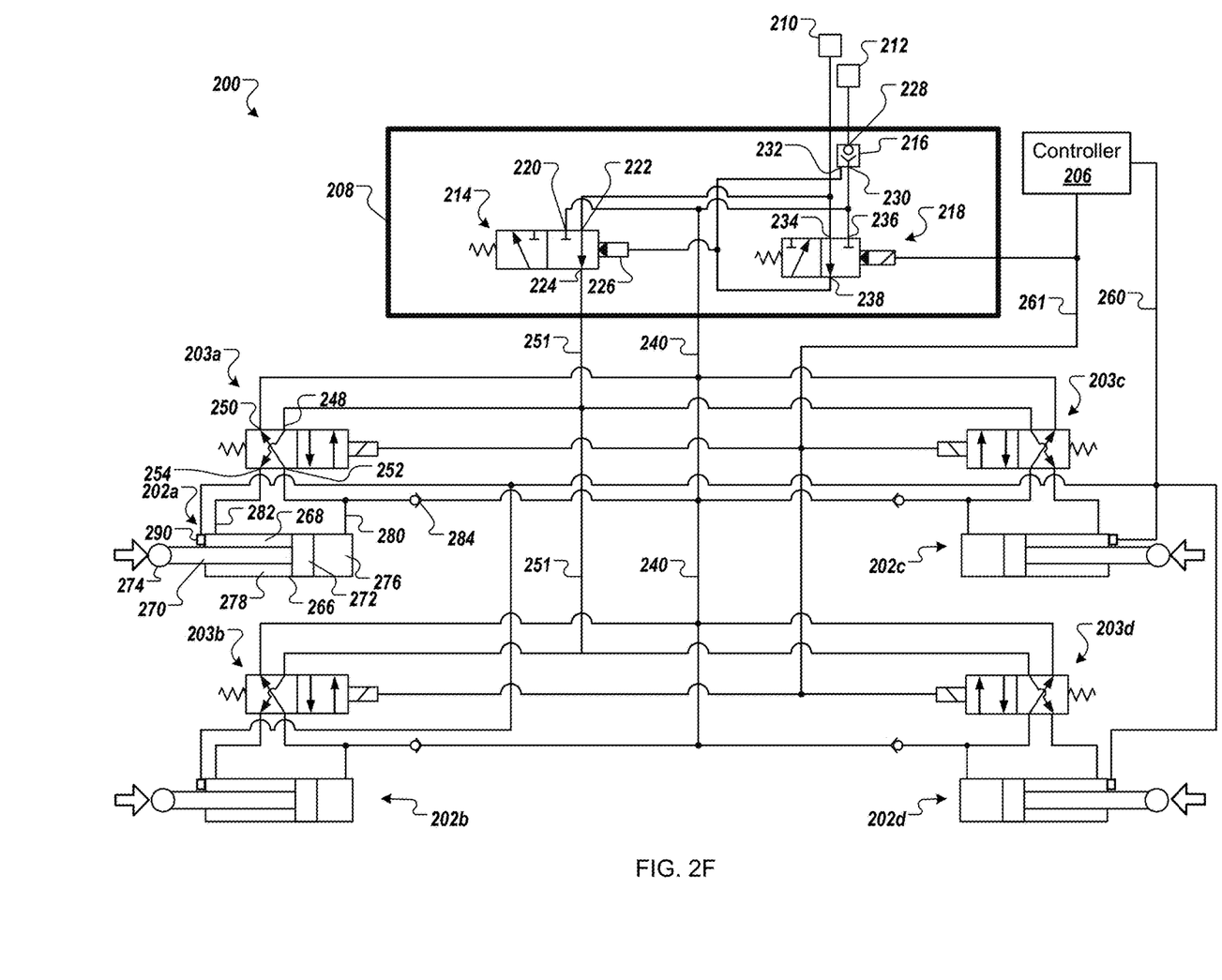

FIG. 2F illustrates the TRAS 200 in an example stow-command condition. The components of the ICU 208 are operated identically to the over-stow-command condition. Pressurized fluid from the fluid source 210 is directed to the stow chamber 278 of the actuators 202a-202d to urge retraction of the actuator rods 270. Fluid in the deploy chamber 276 is urged into the low pressure fluid line 240 and toward the fluid reservoir 212.

In the illustrated example configuration, at least two levels of safety against inadvertent stowing are provided. For example, TRAS 200 is protected against failure of ICV 214 to open, and the TRAS 200 can be protected against the EHSVs 203a-203d being falsely commanded to stow.

The use of terminology such as "front," "rear," "top," "bottom," "raised," "lowered," "upwards," and "downwards" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

Figure 3:
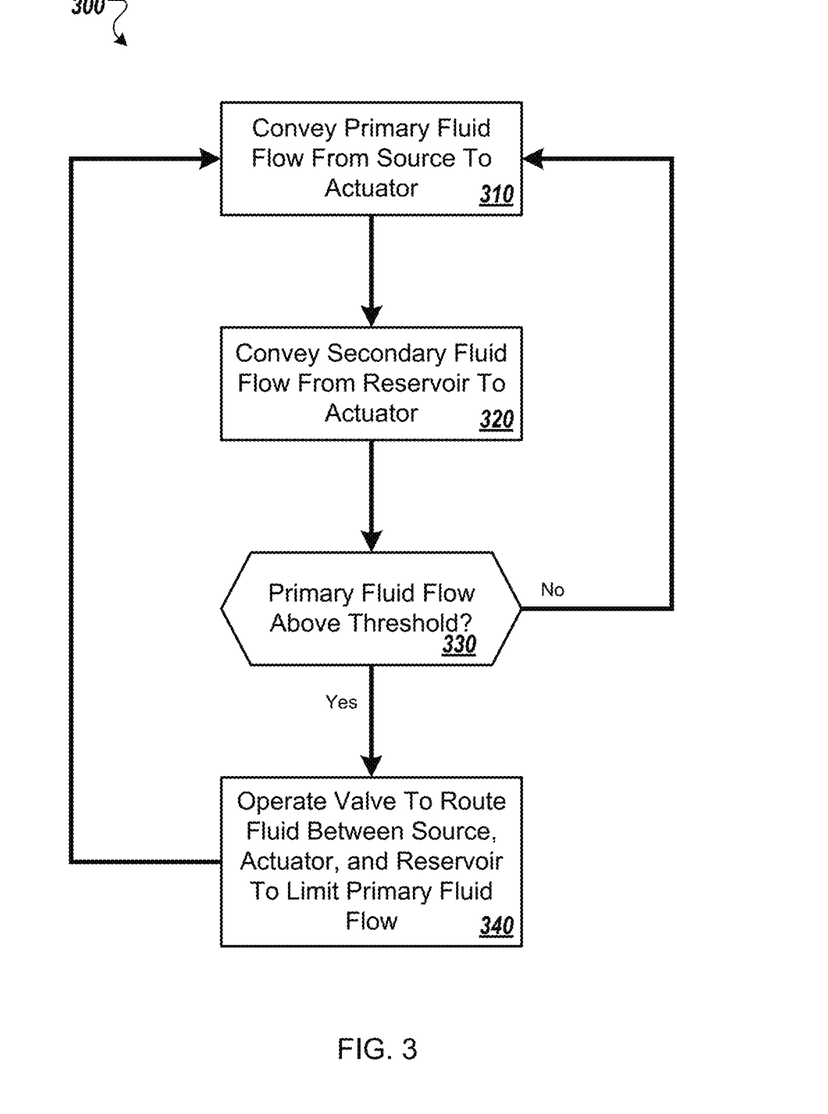
FIG. 3 is a flow diagram of an example process for operating a thrust reverser actuation system.

FIG. 3 is a flow diagram of an example process 300 for operating a thrust reverser actuation system having a thrust-reversing element movable between a stowed position and a deployed position. In some implementations, the process 300 can be performed by the example engine assembly 10 of FIGS. 1A-1B, and/or by the example thrust reverser actuation system 200 of FIGS. 2A-2F. An example of the steps that can be used to transition the thrust-reversing element from the stowed position to the deployed position is described in the following steps.

At 310, a primary fluid flow is conveyed from a pressurized fluid source to a hydraulic actuator coupled to the thrust-reversing element. For example, in FIGS. 2B-2D, fluid from the fluid source 210 is conveyed to the actuators 202a-202d by the fluid line 251.

At 320, a secondary fluid flow is conveyed from a fluid return reservoir to the hydraulic actuator, the secondary fluid flow being separate from the primary fluid flow. For example, in the configuration shown in FIG. 2D, fluid flows from the fluid reservoir, through the low pressure fluid line 240, through the check valve 284, to the deploy chamber 276 of the actuators 202a-202d.

At 330, a determination is made. If the primary fluid flow is not above a predetermined threshold, then the process 300 continues at 310. For example, if aiding loads acting on the actuators 202a-202d causes a primary flow that is at or below a predetermined rate based on a speed of TRAS 200 deployment or a fluid rating of the components in the TRAS 200, then the flow is allowed to continue unmodified.

If at 330, the primary fluid flow is above the predetermined threshold, then the process 300 continues at 340. For example, the controller 206 may determine that flow from the fluid source 210 to the actuators 202a-202d exceeds a known fluid flow limit of the components in the TRAS 200. In some implementations, the predetermined flow threshold can be based on a predetermined maximum deployment speed for the transitioning. For example, the controller 206 may determine that the flow from the fluid source 210 to the actuators 202a-202d exceeds a predetermined rate that corresponds to a predetermined TRAS deployment rate.

At 340, while conveying the primary fluid flow and the secondary fluid flow, an electrohydraulic servo valve operable to selectively route fluid between a pressurized fluid source, the hydraulic actuator, and a fluid return reservoir is operated to limit the primary fluid flow to a predetermined flow threshold. For example, the controller 206 can control the EHSVs 203a-203d to act as variable flow limiters. By controlling the EHSVs 203a-203d, the controller 206 can control the release of fluid from the stow chamber 278 and in turn limit, reduce, or otherwise control the flow of fluid being drawn into the deploy chamber 276. By controlling the rate of flow out of the stow chamber 278, the controller 206 can also control the speed of actuation of the actuator rod 270 and the TRAS element(s) connected to the actuator rod 270.

In some implementations, the process 300 can also include operating an isolation control valve to selectively inhibit or permit fluid flow between the electrohydraulic servo valve, the pressurized fluid source and the fluid return reservoir, configuring a piloted check valve to a first stage, where fluid flow from the fluid return reservoir to the hydraulic actuator through a bypass fluid line providing fluid communication between the hydraulic actuator and the fluid return reservoir independent of the electrohydraulic servo valve is inhibited, and configuring the piloted check valve to a second stage, where fluid flow from the fluid return reservoir to the hydraulic actuator is permitted. For example, in the example configurations shown in FIGS. 2A and 2E, the piloted check valve 216 is closed and inhibits flow from the fluid reservoir 212 to the low pressure fluid line 240, which in the example configurations shown in FIGS. 2B-2D and 2F, the piloted check valve 216 is configured to its second stage such that flow from the fluid reservoir 212 to the low pressure fluid line 240 is permitted.

In some implementations, the process 300 can also include controlling a solenoid valve coupled to both the isolation control valve and the piloted check valve, and concurrently controlling, by the solenoid valve, operation of the isolation control valve and the piloted check valve. For example, the solenoid valve 218 controls fluid flow from the fluid source 210 to both the pilot valve 226 and the pilot port 232 to control the control operation of both the isolation control valve 214 and the piloted check valve 216 at substantially the same time.

In some implementations, the process 300 can also include receiving a thrust-reverser-deploy command, controlling the solenoid valve based on the receiving, and initiating, by the solenoid valve, transition of the piloted check valve from the first stage to the second stage. For example, the controller 206 can receive a signal indicating that the TRAS 200 is to be deployed, and the controller 206 can respond by controlling the solenoid valve 218 to cause pressurized fluid from the fluid source 210 to flow to the pilot port 232 and cause the piloted check valve 216 to change from its first stage in which flow from the fluid reservoir 212 to the low pressure fluid line 240 is inhibited, to its second stage in which flow from the fluid reservoir 212 to the low pressure fluid line 240 is permitted.

In some implementations, the process 300 also includes operating the electrohydraulic servo valve in a deploy stage, routing, by the electrohydraulic servo valve in the deploy stage, fluid from the pressurized fluid source to a deploy chamber of the hydraulic actuator, fluidically connecting, by the electrohydraulic servo valve in the deploy stage, the deploy chamber and the stow chamber, recirculating, through the electrohydraulic servo valve in the deploy stage, fluid from the stow chamber to the deploy chamber, operating the electrohydraulic servo valve in a stow stage, and routing, by the electrohydraulic servo valve in the stow stage, fluid from the pressurized fluid source only to the stow chamber of the hydraulic actuator. For example, in the example configuration shown in FIG. 2D, fluid from the fluid source 210 is routed by the EHSVs 203a-203d to the deploy chamber 276, and fluid from the stow chamber 278 is recirculated to the deploy chamber through the check valve 284, and in the example configuration shown in FIG. 2F, fluid from the fluid source 210 is routed to only the stow chamber 278.

In some implementations, the process 300 can include permitting, by an anti-cavitation check valve residing on the bypass fluid line providing fluid communication between the hydraulic actuator and the fluid return reservoir independent of the electrohydraulic servo valve, fluid flow from the fluid return reservoir to the hydraulic actuator, and inhibiting, by the anti-cavitation check valve, fluid flow from the hydraulic actuator to the fluid return reservoir. For example, the check valve 284 is configured to permit flow from the fluid reservoir 212 along the low pressure fluid line 240 to the deploy chamber 276, but prevent flow from the deploy chamber 276 to the fluid reservoir 212 through the low pressure fluid line 240. In some implementations, the anti-cavitation check valve can be configured to permit fluid flow when the pressure in a deploy chamber of the hydraulic actuator is less than the pressure at the fluid return reservoir. For example, in the example configuration shown in FIG. 2D, aiding loads on the actuator rod 270 cause pressure in the deploy chamber 276 to drop below the pressure in the low pressure fluid line 240, causing flow from the fluid reservoir 212 to flow along the low pressure fluid line 240, through the check valve 284, to the deploy chamber 276.

In some implementations, the process 300 can also include receiving a position feedback signal representative of a position of the thrust-reversing element, wherein the predetermined flow threshold is based on a predetermined maximum deployment speed for the transitioning. For example, the position sensors 290 can provide position feedback signals to the controller 206. The position feedback signals represent the amount of extension or retraction of the actuator rods 270, and in turn, the position of the thrust reverser elements connected to them. The speed of movement of the actuator rods 270 can be mathematically correlated to the fluid flow out of the stow chambers 278 and/or the fluid flow into the deploy chamber 276 caused by the movement. In some implementations, the deployment speed of the thrust reversers may have an allowable speed limit (e.g., to prevent jarring or overstressing the TRAS 200 during deployment), and that speed limit can be correlated to a corresponding fluid flow rate. The controller 206 can use the position feedback signals to determine the speed at which the thrust reverser elements are being deployed, and the corresponding fluid flow(s), and compare the corresponding fluid flow(s) against the speed-based fluid flow limit to control operation of the EHSVs 203a-203d to limit or otherwise control the deployment speed of the thrust reverser elements.

The systems described above can be configured to offer multiple levels of safety against inadvertent actuator deployment (IAD) in at least three different ways (e.g., per transcowl). First, for example, mechanical safety can be provided by locking a first locking servo TRAS actuator, by locking a second locking servo TRAS actuator, and by activating a tertiary lock. Second, for example, hydraulic safety can be provided by the ICV 214, the spring bias of the EHSVs 203a-203d, and by activating a tertiary lock. Third, for example, electrical safety can be provided by a shut off valve on the ICV 214, by the spring bias of the EHSVs 203a-203d, and by a tertiary lock solenoid or shut off valve.

The systems described above can be configured to offer multiple levels of safety against inadvertent stow in at least two different ways. For example, in order for an inadvertent stow to occur, the ICV 214 would have to fail open and the spring bias of the EHSVs 203a-203d would have to fail closed (e.g., in the stow configuration).

A number of embodiments of the invention have been described. Nevertheless, it will be understood that various modifications may be made without departing from the spirit and scope of the inventions.

What is claimed is:

1. A method of operating an engine thrust reverser comprising a thrust-reversing element movable between a stowed position and a deployed position, the method comprising:
    transitioning the thrust-reversing element from the stowed position to the deployed position by:
    conveying a primary fluid flow from a pressurized fluid source to a hydraulic actuator coupled to the thrust-reversing element;
    conveying a secondary fluid flow from a fluid return reservoir to the hydraulic actuator, the secondary fluid flow being separate from the primary fluid flow; and
    while conveying the primary fluid flow and the secondary fluid flow, operating an electrohydraulic directional control servo valve, the operating comprising:
        configuring the electrohydraulic directional control servo valve to a first deploy stage in which the pressurized fluid source is fluidically connected to a deploy chamber of the hydraulic actuator and the fluid return reservoir is fluidically connected to a stow chamber of the hydraulic actuator;
        controllably routing, through the electrohydraulic directional control servo valve in the first deploy stage, fluid from the pressurized fluid source to the deploy chamber;
        configuring the electrohydraulic directional control servo valve to a second deploy stage in which the pressurized fluid source is fluidically connected to the deploy chamber and the stow chamber is fluidically connected to the deploy chamber;
        controllably routing, through the electrohydraulic directional control servo valve, fluid from the stow chamber to the deploy chamber;
        configuring the electrohydraulic directional control servo valve to a stow stage; and
        routing, through the electrohydraulic directional control servo valve, fluid from the pressurized fluid source to the stow chamber; and
    unidirectionally communicating, by a check valve, fluid from the stow chamber to the deploy chamber; and
    permitting, by the check valve, fluid flow from the fluid return reservoir to the hydraulic actuator, wherein the check valve resides on a bypass fluid line providing fluid communication between the hydraulic actuator and the fluid return reservoir independent of the electrohydraulic directional control servo valve; and
    inhibiting, by the check valve, fluid flow from the deploy chamber to the fluid return reservoir.

2. The method of claim 1, further comprising limiting, by the electrohydraulic directional control servo valve, the primary fluid flow to a predetermined flow threshold that is based on a predetermined maximum deployment speed for the transitioning.

3. The method of claim 2, further comprising receiving a position feedback signal representative of a position of the thrust-reversing element, wherein the predetermined flow threshold is based on the predetermined maximum deployment speed for the transitioning.

4. The method of claim 1, further comprising:
    operating an isolation control valve to selectively inhibit or permit fluid flow between the electrohydraulic directional control servo valve, the pressurized fluid source and the fluid return reservoir;
    configuring a piloted check valve to a first pilot stage, where fluid flow from the fluid return reservoir to the hydraulic actuator through a bypass fluid line providing fluid communication between the hydraulic actuator and the fluid return reservoir independent of the electrohydraulic directional control servo valve is inhibited; and
    configuring the piloted check valve to a second pilot stage, where fluid flow from the fluid return reservoir to the hydraulic actuator is permitted.

5. The method of claim 4, further comprising:
    controlling a solenoid valve coupled to both the isolation control valve and the piloted check valve; and
    concurrently controlling, by the solenoid valve, operation of the isolation control valve and the piloted check valve.

6. The method of claim 5, further comprising:
receiving a thrust-reverser-deploy command;
controlling the solenoid valve based on the receiving; and initiating, by the solenoid valve, transition of the piloted check valve from the first pilot stage to the second pilot stage.

7. The method of claim 1, wherein the check valve is configured to permit fluid flow when a pressure in the deploy chamber of the hydraulic actuator is less than a pressure at the fluid return reservoir.

\* \* \* \* \*